US012538898B2

(12) United States Patent
Myles et al.

(10) Patent No.: US 12,538,898 B2
(45) Date of Patent: *Feb. 3, 2026

(54) ANIMAL CAGE-SAMPLE COLLECTION APPARATUS

(71) Applicant: IDEXX Laboratories, Inc., Westbrook, ME (US)

(72) Inventors: Matthew H. Myles, Moberly, MO (US); Marcus J. Crim, Columbia, MO (US); Robert S. Livingston, Columbia, MO (US); Cynthia L. Besch-Williford, Hallsville, MO (US); Kristin S. Riley, Cape Elizabeth, ME (US)

(73) Assignee: IDEXX LABORATORIES, INC, Westbrook, ME (US)

(*) Notice: Subject to any disclaimer, the term of this patent is extended or adjusted under 35 U.S.C. 154(b) by 0 days.

This patent is subject to a terminal disclaimer.

(21) Appl. No.: 18/633,241

(22) Filed: Apr. 11, 2024

(65) Prior Publication Data

US 2024/0260545 A1 Aug. 8, 2024

Related U.S. Application Data

(63) Continuation of application No. 16/967,681, filed as application No. PCT/US2019/012252 on Jan. 4, 2019, now Pat. No. 11,974,546.

(60) Provisional application No. 62/627,617, filed on Feb. 7, 2018.

(51) Int. Cl.
*A01K 23/00* (2006.01)
*A01K 1/03* (2006.01)

(52) U.S. Cl.
CPC ............. *A01K 23/005* (2013.01); *A01K 1/03* (2013.01)

(58) Field of Classification Search
CPC .................................. A01K 23/00; A01K 1/03
USPC ..................................................... 294/1.3, 1.4
See application file for complete search history.

(56) References Cited

U.S. PATENT DOCUMENTS

| 3,785,347 | A | 1/1974 | Dinnerstein |
| 4,624,705 | A | 11/1986 | Jatkar |
| D304,248 | S | 10/1989 | Elrod |
| 5,419,282 | A | 5/1995 | Dennis |

(Continued)

FOREIGN PATENT DOCUMENTS

| WO | 2004/014253 | 2/2004 |
| WO | 2010/144494 | 12/2010 |
| WO | 2018/073628 | 4/2018 |

OTHER PUBLICATIONS

Frynta et al. "Apparatus for Collection of Fecal Samples from Undisturbed Spiny Mice (*Acomys cahirinus*) Living in a Complex Social Group," journal of the American Associate for Laboratory Animal Science, Mar. 1, 2009 (Mar. 1, 2009), col. 48, No. 2, pp. 196-201.

(Continued)

*Primary Examiner* — Paul T Chin
(74) *Attorney, Agent, or Firm* — McDonnell Boehnen Hulbert & Berghoff LLP (57) ABSTRACT

Apparatuses, systems, and methods for the collection and sampling of agents (including organisms and pathogens) to determine the health of an animal colony. A collection media is configured to collect a sample from a target animal, such as a mouse or rat. The collected sample may include dust, feces, fur, urine, saliva, or other aspect of the target animal's environment.

7 Claims, 4 Drawing Sheets

(56) References Cited

U.S. PATENT DOCUMENTS

| | | | |
|---|---|---|---|
| 5,996,535 | A | 12/1999 | Semenuk et al. |
| 6,585,363 | B1 | 7/2003 | Tanaka |
| 6,688,256 | B1 | 2/2004 | King |
| 6,832,580 | B2 | 12/2004 | Marchioro |
| 7,343,876 | B2 | 3/2008 | Frisbee |
| 8,561,574 | B2 * | 10/2013 | Tchekneva ............. A01K 1/031 |
| | | | 119/458 |
| 9,992,980 | B2 | 6/2018 | Tominaga |
| 10,660,298 | B2 | 5/2020 | Cantwell et al. |
| 2009/0250012 | A1 | 10/2009 | Greene et al. |
| 2014/0378329 | A1 | 12/2014 | Myles |
| 2022/0298585 | A1 | 9/2022 | Henderson |

OTHER PUBLICATIONS

Cook, N. "Review: Minimally Invasive Sampling Media and the Measurement of Corticosteroidsas Biomarkers of Stress in Animals," Candadian Journal of Animal Science, Sep. 1, 2012 (Sep. 1, 2012), vol. 92, Iss. 3, pp. 227-259.

Lobo et al. "A New Method for Noninvasive Genetic Sampling of Saliva in Ecological Research," PLoS One, Oct. 23, 2015 (Oct. 23, 2015), vol. 10, Iss. 10, pp. 1-21.

Lanyon et al. "Groups of Congenic Mice Tested are Distinguishable on Basis of Microbiology of Their Scent Marks," Federation of European Microbiological Societies, Dec. 22, 2006 (Dec. 22, 2006), vol. 59, Iss. 3, pp. 576-583.

International Search Report and Written Opinion for International Application No. PCT/US2019/012252, mail date Apr. 1, 2019, 31 pages.

\* cited by examiner

| Cage | Sample | Jawetz | Heyl | M. pulmonis | Helico. Spp | H. bilis | H. rodentium | H. typhlonius | H. ganmani | H. mastom. | Pinworm Spp | Aspicularis | Syphacia | S. muris | E. muris | T. muris | PanB | MNV | MHV | TMEV | PanB2 |
|---|---|---|---|---|---|---|---|---|---|---|---|---|---|---|---|---|---|---|---|---|---|
| 1 | Cage Ball | 35.65 | - | 33.76 | 26.69 | 35.62 | 29.88 | - | - | 28.41 | - | - | - | - | - | 33.59 | 27.9 | 37.72 | - | - | 24.78 |
| | Cage Swab | 36.46 | - | 35.73 | 27.78 | - | 31.47 | - | - | 28.56 | - | - | - | - | - | 33.71 | 29.89 | - | - | - | 26.30 |
| 2 | Cage Ball | 33.94 | 37.43 | 29.12 | 26.22 | 36.06 | 31.48 | 32.08 | - | 29.58 | 34.96 | 34.56 | 35.26 | 36.76 | 29.09 | 36.09 | 26.52 | 37.50 | - | - | 23.56 |
| | Cage Swab | 35.26 | 39.45 | 30.58 | 28.48 | 35.84 | 32.71 | 35.77 | - | 30.47 | 34.48 | 33.59 | - | - | 30.49 | - | 28.41 | - | - | - | 25.59 |
| 3 | Cage Ball | 33.47 | 40.00 | 36.14 | 24.18 | 35.45 | 28.90 | - | 32.76 | 27.53 | 30.45 | 28.05 | 31.79 | 36.65 | 36.67 | 33.26 | 26.12 | 32.95 | 36.65 | 37.11 | 22.53 |
| | Cage Swab | 35.20 | - | 36.12 | 25.97 | 36.6 | 31.03 | - | 34.24 | 28.13 | 33.45 | 32.17 | 34.13 | - | - | 34.71 | 27.49 | 33.09 | - | 38.16 | 23.36 |
| 4 | Cage Ball | - | - | - | 28.36 | 33.2 | 30.98 | - | - | 31.28 | 32.9 | 32.64 | - | - | 33.99 | 35.15 | 28.19 | - | - | - | 24.83 |
| | Cage Swab | 35.97 | 37.04 | - | 26.36 | 30.83 | 28.89 | - | - | 28.40 | 28.02 | 28.64 | - | - | 31.59 | 35.07 | 28.05 | - | - | - | 24.22 |
| 5 | Cage Ball | 36.85 | 40.00 | - | 29.91 | - | 37.074 | - | 33.6 | - | 30.04 | 29.95 | 36.71 | - | 32.37 | - | 26.26 | - | - | - | 24.55 |
| | Cage Swab | 35.79 | 38.39 | - | 28.86 | 35.11 | - | - | 32.24 | - | 26.44 | 26.60 | - | - | 31.05 | - | 30.28 | - | - | 38.38 | 26.77 |
| 6 | Cage Ball | 34.43 | 34.95 | 33.07 | 25.64 | 32.87 | 31.27 | - | 31.89 | 30.04 | 26.61 | 28.08 | 26.64 | - | - | 35.15 | 23.87 | 34.89 | 36.80 | 37.21 | 21.16 |
| | Cage Swab | 36.81 | 39.12 | - | 29.12 | 34.95 | 35.23 | - | 35.78 | 34.54 | 30.79 | 30.22 | 31.45 | - | - | 35.56 | 28.95 | - | - | - | 24.91 |
| 7 | Cage Ball | 33.65 | 34.97 | 33.13 | 28.12 | 35.96 | 30.5 | - | - | - | 31.29 | 28.99 | 32.85 | - | 33.13 | 34.75 | 27.08 | - | - | - | 23.49 |
| | Cage Swab | 36.74 | 35.31 | 35.15 | 28.75 | - | 31.48 | - | - | - | 33.71 | 31.71 | 35.80 | - | 35.35 | - | 28.98 | 37.43 | - | - | 25.55 |
| 8 | Cage Ball | 34.79 | - | - | 29.63 | - | - | - | 33.57 | 35.43 | 30.09 | 30.91 | 30.23 | - | 34.77 | 35.48 | 28.13 | - | - | - | 24.40 |
| | Cage Swab | 35.07 | 38.21 | - | 29.82 | - | - | 32.08 | 35.22 | 35.27 | 29.06 | 31.09 | 28.72 | 36.71 | 33.73 | 35.09 | 28.31 | 36.71 | - | - | 24.70 |
| CP Cage Ball | | 34.68 | 36.84 | 33.044 | 27.34 | 34.86 | 31.44 | 32.08 | 32.96 | 30.38 | 30.91 | 30.45 | 32.25 | 36.71 | 33.34 | 34.78 | 26.76 | 35.77 | 36.80 | 37.21 | 23.66 |
| CP Cage Swab | | 35.91 | 37.92 | 34.395 | 28.14 | 34.67 | 31.80 | 35.77 | 34.37 | 30.90 | 30.85 | 30.57 | 32.53 | - | 34.54 | 34.83 | 28.80 | 35.74 | - | - | 25.18 |
| CP Difference (Swab-Ball) | | 1.23 | 1.08 | 1.35 | 0.80 | -0.19 | 0.36 | 3.69 | 1.42 | 0.52 | -0.06 | 0.12 | 0.28 | | 1.20 | 0.05 | 2.04 | -0.02 | | | 1.51 |
| CP Average Difference | 0.90 | | | | | | | | | | | | | | | | | | | | |

| | Total Missed |
|---|---|
| Cage Ball missed | 7 |
| Cage Swab missed | 18 |

| Cage Ball missed | 1 | 2 | 0 | 0 | 1 | 0 | 0 | 0 | 0 | 0 | 0 | 0 | 0 | 0 | 0 | 0 | 2 | 0 | 1 | 0 |
| Cage Swab missed | 0 | 1 | 1 | 0 | 2 | 1 | 0 | 0 | 0 | 0 | 0 | 2 | 2 | 1 | 2 | 0 | 3 | 2 | 1 | 0 |

FIG. 6

ANIMAL CAGE-SAMPLE COLLECTION APPARATUS

CROSS-REFERENCE TO RELATED APPLICATIONS

This application continuation of U.S. patent application Ser. No. 16/967,681, filed Aug. 5, 2022, now U.S. Pat. No. 11,974,546, which is a U.S. National Phase Application under 35 U.S.C. § 371 of International Application No. PCT/US2019/012252, filed Jan. 4, 2019, which claims priority to U.S. Patent Application No. 62/627,617, filed Feb. 7, 2018, which are hereby incorporated by reference in their entirety.

FIELD

The disclosure generally relates to apparatuses, systems, and methods for the collection of samples from a group of target animals in order to test for a variety of agents that may contaminate the target animal population.

BACKGROUND

Great strides have been made in the identification and eradication of infections from laboratory rodents. As a result, most contemporary biomedical research rodent colonies are relatively free of the agent such as pathogenic viruses, parasites, bacteria, and fungi that cause clinical disease. Timely and accurate diagnosis of infectious disease in animal research models is critical to the success of biomedical research. To this end, institutional veterinarians closely monitor the health of research animals through periodic systematic examination of sample groups of research animals against a predetermined list of infectious agents.

Existing devices and methods for testing colonies of research animals involve the use of sentinel animals that may be exposed to the general population of research animals either directly or indirectly. Examples of existing systems for exposing and testing of sentinel animals include the use of isolation cages and soiled bedding systems, among others. After being exposed, the sentinel animals may be tested for a vast array of infectious agents. In some existing examples, the testing process may include taking blood or euthanasia of the sentinel animals.

Notably, such processes are inconvenient, expensive, and lack sensitivity for some agents. For example, indirect collection methods are not reliable as some agents are not easily transferred from the animal colony to a sentinel. Or some existing testing methods may only function to collect samples from a single source, such as feces, within the animal's environment.

Accordingly, the inventors have identified a need in the art to provide a simplified and efficient method for sample collection and accurate analysis to ensure cost effective colony management.

SUMMARY

In one aspect, the disclosure is directed to a cage-sample collection apparatus. The collection apparatus includes a perforated housing that includes collection media. The collection media is configured to collect a sample from a target animal through the perforations of the perforated housing when the target animal interacts with the perforated housing. In some embodiments, the collection media is exposed to the sample of the target animal through at least one perforation of the perforated housing. In other embodiments, the sample media may be a portion or extension of the housing. In further aspects, the collected sample may include at least one of dust, feces, fur, urine, and saliva.

In more example aspects, the collection media is removable from the perforated housing. In another example, the collection media includes a synthetic polymer such as, but not limited to, nylon, polyester (such as Dacron®), or rayon, that is configured to absorb or adsorb the sample from the target animal. In another embodiment, a system that includes an animal cage and a cage-sample collection apparatus that is located within the animal cage.

In yet further embodiments, a method is described. The method includes placing a cage-sample collection apparatus in an animal cage that houses at least one target animal. The method includes collecting a sample by allowing the target animal to interact with the cage-sample collection apparatus in the animal cage. Additionally, the method includes removing the collection media from the animal cage and analyzing the collection media for the presence of an agent or a marker for the agent that may indicate a disease.

These as well as other aspects, advantages, and alternatives, will become apparent to those of ordinary skill in the art by reading the following detailed description, with reference where appropriate to the accompanying drawings.

BRIEF DESCRIPTION OF THE FIGURES

FIG. 6 provides the results of an experiment to compare results of an analysis of direct cage swab samples to samples collected with an embodiment of the cage-sample collection apparatus according to the disclosure.

DESCRIPTION

Example methods and systems are described herein. The words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure addresses the challenges associated with the collection, identification and processing of voluminous numbers of samples obtained from animal colonies, and in particular rodent colonies. These colonies may have many thousands of members and are maintained for research purposes. In most cases, it is critical to be able to quickly and inexpensively monitor the health of a colony. The disclosure describes apparatuses and devices that make cage-sample collection and analysis more efficient, timely, accurate for some agents, and cost-effective.

An example cage-sample collection apparatus may be introduced to an animal colony within a cage. The apparatus may be disposable or autoclavable, include removable collection media, and may also serve as an environmental enrichment device within the cage. The cage-sample collection apparatus may be introduced at a cage change and allow for collection at the cage-level of an environmental sample for analysis by a variety of methods including immunoassay and nucleic acid analysis (e.g., polymerase chain reaction (PCR)). A target animal, e.g. a rodent, mouse, and/or rat, may interact with the cage-sample collection apparatus by moving it around the cage, burying the apparatus into the bedding of the cage, traveling through the apparatus (e.g., if the apparatus is tubular in shape), chewing on the apparatus or otherwise interacting with it. In some examples, the cage-sample collection apparatus may be part of or attached to a cage.

In some aspects, a cage-sample collection apparatus may have additional functions in addition to providing a means for collection a cage-level environmental sample. For instance, the cage-sample collection apparatus may be considered an environmental enrichment device or may include environmental enrichment features or aspects. An environmental enrichment device is a device that is provided to animals in captivity in order to enhance animal welfare and/or the quality of care by providing environmental stimuli to the animal for increased psychological and physiological well-being. An environmental enrichment device or component that may be coupled to a collection apparatus may be designed to improve or maintain an animal's physical and psychological health by increasing the range or number of species-specific behaviors, increasing positive utilization of the captive environment, preventing or reducing the frequency of abnormal behaviors.

The cage-sample collection apparatus includes a collection media that can collect a sample, e.g. dust, feces, fur, urine, or saliva, among others, from the target animal. In some examples, the collection media may be secured or bonded to the collection apparatus, such as to an exterior surface or an interior surface of the apparatus. Within other examples, the collection media may be exposed to such samples through a perforated housing or structure of the collection apparatus. The collection media may be easily removed from the collection apparatus such that the media may be tested for one or more of a variety of agents (or markers for the agents) that may be indicative of the presence of disease. In some examples, the collection media may include flocked swab tips, fleeces, or synthetic polymeric materials, such as, but not limited to, nylon, polyester (such as Dacron®), or rayon, configured to collect a sample from the target animal.

Within examples where the target animal is a mouse, the collection media may be analyzed for the presence of one or more infectious agents including, but not limited to: Mouse Hepatitis Virus (MHV); Minute Virus of Mice (MVN); NS1 (Generic Parvovirus); Mouse Pneumonia Virus (e.g., MPV1-5); Mouse Norovirus (MNV); Theiler's encephalomyelitis virus (TMEV); Mouse Group A rotavirus (Epizootic Diarrhea of Infant Mice (EDIM)); Sendai virus; *Mycoplasma pulmonis*; Pneumonia Virus of Mice (PVM); Reovirus Type 3 (REO3); Lymphocytic Choriomeningitis (LCMV); Ectromelia virus; Murine adenovirus 1 (MAD1); Murine Adenovirus 2 (MAD2); Polyoma virus; *Encephalitozoon cuniculi; Filobacterium rodentium*, aka. Cilia-Associated Respiratory *Bacillus* (CARB); *Clostridium piliforme*; Mouse Cytomegalovirus (MCMV); K virus; Hantaan virus; Lactate dehydrogenase-elevating virus; Mouse Thymic Virus (MTV, MTLV); *Helicobacter bilis, Helicobacter hepaticus, Helicobacter rodentium, Helicobacter typhlonius, Helicobacter ganmani; Helicobacter mastomyrinus; Helicobacter* spp. (generic assay, detects all *Helicobacter* spp.); *Mycoplasma pulmonis; Pasteurella pneumotropica* biotype Heyl; *Pasteurella pneumotropica* biotype Jawetz; *Entamoeba muris; Spironucleus muris; Tritrichomonas muris; Aspicularis tetraptera; Syphacia obvoleta*; and/or Pinworm (generic assay, detects both *Aspicularis tetrapter* and *Syphacia obvoleta*), *Corynebacterium bovis, Corynebacterium* sp. (Hyperkeratosis-associated *Corynebacterium* 2, HAC2), *Klebsiella pneumoniae, Klebsiella oxytoca, Staphylococcus aureus, Staphylococcus xylosis, Citrobacter rodentium, Pseudomonas aeruginosa, Clostridium piliforme, Clostridium difficile, Bordetella bronchiseptica, Bordetella hinzii, Bordetella pseudohinzii, Proteus mirabilis, Proteus* spp., *Salmonella* spp., *Salmonella enterica, Pneumocystis murina*, Murine astrovirus, *Giardia* spp., *Demodex musculi, Cryptosporidium* spp., *Eimeria* spp., *Myocoptes musculinus, Radfordia affinis/Radfordia ensiphora/Myobia musculi, Ornithonyssus* spp., and *Rodentolepis nana*. Other known mouse infectious agents (i.e., viruses, bacteria, parasites, etc.) may also be tested for by analyzing the collection media.

Within examples where the target animal is a rat, the collection media may be analyzed for the presence of one or more infectious agents including, but not limited to: Rat Coronaviruses RCV; Sialodacryoadenitis Virus (SDAV); NS1 (Generic Parvovirus); Rat Parvoviruses (RPV-1, RPV-2, RMV, KRV, H-1); Rat Theilovirus (RTV); Boone Cardiovirus (BCV), Sendai virus; Pneumonia Virus of Mice (PVM); *Mycoplasma pulmonis*; Reovirus Type 3 (REO3); Lymphocytic Choriomeningitis Virus (LCMV); Cilia-Associated Respiratory *Bacillus* (CARB); Hantavirus; *Clostridim piliforme*; Mouse Adenovirus 1 (MAD1); Mouse Adenovirus 2 (MAD2); *Encephalitozoom cuniculi*; Group B rotavirus of rats/(Infectious Diarrhea of Infant Rats (IDIR), Rat Polyomavirus 2, *Helicobacter bilis, Helicobacter hepaticus, Helicobacter rodentium, Helicobacter typhlonius, Helicobacter ganmani; Helicobacter mastomyrinus; Helicobacter* spp. (generic assay, detects all *Helicobacter* spp.); *Mycoplasma pulmonis; Streptobacillus moniliformis, Streptococcus pneumoniae*, beta-hemolytic *Streptococcus* spp. (not Group B), *Pasteurella pneumotropica* biotype Heyl; *Pasteurella pneumotropica* biotype Jawetz; *Entamoeba muris; Spironucleus muris; Tritrichomonas muris; Aspiculuris tetraptera; Syphacia muris*; and/or Pinworm (generic assay, detects both *Aspiculuris tetraptera* and *Syphacia muris*), *Corynebacterium bovis, Corynebacterium* sp. (Hyperkeratosis-associated *Corynebacterium* 2, HAC2), *Corynebacterium kutscheri, Klebsiella pneumoniae, Klebsiella oxytoca, Staphylococcus aureus, Staphylococcus xylosus, Citrobacter rodentium, Proteus mirabilis, Proteus* spp., *Pseudomonas aeruginosa, Clostridium piliforme, Clostridium difficile, Bordetella bronchiseptica, Bordetella hinzii, Bordetella pseudohinzii, Salmonella* spp., *Salmonella enterica, Pneumocystis* spp., *Encephalitozoon cuniculi, Giardia* spp., *Demodex* spp., *Cryptosporidium* spp., *Eimeria* spp., *Polyplax* spp., *Myocoptes musculinus, Radfordia affinis/Radfordia ensifera/Myobia musculi, Ornithonyssus* spp., *Hymenolepis* spp. and *Rodentolepis nana*. Other. Other known rat infectious agents (i.e., viruses, bacteria, parasites, etc.) may also be tested for by analyzing the collection media.

Beneficially, as described herein, the cage-sample collection apparatus can be easily introduced and removed from a colony of target animals. Target animals may interact directly with the cage-sample collection apparatus, and in some embodiments, the collection apparatus may take the form or otherwise include an environmental enrichment feature. Moreover, collection media within the collection apparatus may be quickly removed from the apparatus such that the media may be tested for various agents that provide indication of the health of the colony. A cage-sample collection apparatus may be reusable such that the media within can be replaced after being removed, or cage-sample collection apparatuses described may be entirely disposable.

Testing of the collection media includes extracting nucleic acids from the sample collection media using commercially available reagents and a commercially available extraction platform designed for the purpose of extracting nucleic acids for molecular analysis. The extracted nucleic acids may be examined for the presence of nucleic acids of target organisms using a commercially available real-time PCR platform.

Figure 1:
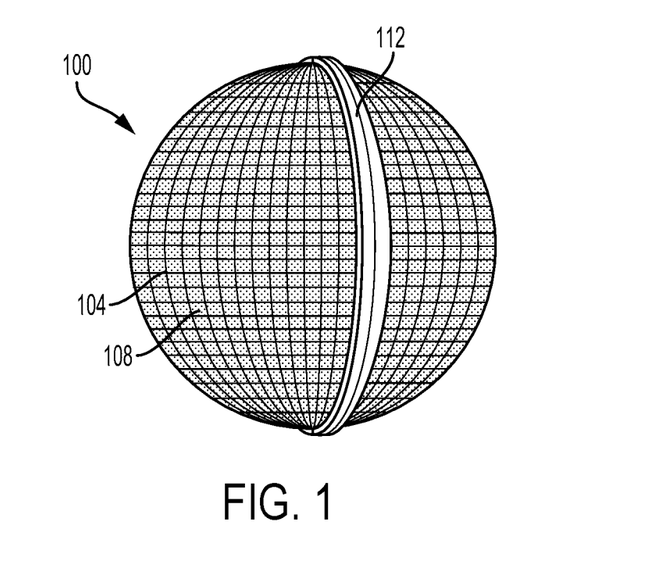
FIG. 1 illustrates a cage-sample collection apparatus, according to an example embodiment.

Various example embodiments are disclosed below with respect to the Figures. FIG. 1 illustrates a cage-sample collection apparatus 100, according to an example embodiment. The collection apparatus 100 includes a perforated housing 104, a collection media 108, and a securing mechanism 112. One or more cage-sample collection apparatus(es) 100 may be placed within an animal cage, or a series of animal cages in order to make a determination about the health of a colony of target animals. The collection media 108 is disposed within the perforated housing 104 such that when a target animal interacts with the perforated housing 104, the collection media 108 is exposed to a sample from the target animal through the at least one perforation of the perforated housing 104. The collection media 108 may absorb the sample collected such that the sample may be tested for an array of agents that may indicate the health of the target animal.

The perforated housing 104 of the collection apparatus 100 may be steel (e.g. stainless steel), another metal, alloy, or plastic. The perforated housing 104 may be considered a mesh. As shown, the exterior shape of the perforated housing 104 is generally spherical. Alternatively, perforated housing 104 can be any suitable shape, such as rectangular, square, polyhedron, cylindrical, and the like. In this specific example, when perforated housing 104 is generally spherical, a target animal may easily roll or otherwise move the collection apparatus 100 around a cage or enclosure, thereby interacting with the collection apparatus 100 and exposing the collection media 108 to a sample through the perforations of the perforated housing 104. By moving, playing, or otherwise interacting with the collection apparatus 100, the collection apparatus 100 may also be considered or include an environmental enrichment device.

Within examples, the perforated housing 104 may be hinged, clasped, or otherwise arranged such that the securing mechanism 112 maintains the collection media 108 within the perforated housing 104. The securing mechanism 112 may include a clasp, a clip, a magnet, or a variety of mechanical securing mechanisms such that the collection media 108 remains inside the perforated housing 104 while the collection apparatus 100 is accessible by a target animal. The securing mechanism 112 may later allow access for a researcher or user to open the perforated housing 104 thereby gaining access to the collection media 104 so the collection media 104 may be removed from the perforated housing 104 and tested. In other examples, a perforated housing of a collection apparatus may not include a securing mechanism, and in such an example the perforated housing may be tested for agents as a whole.

The collection media 108 may include a flocked swab tip, a synthetic polymer such as, but not limited to, nylon, polyester (such as Dacron®), or rayon), or other material that is configured to absorb a sample (such as dust, feces, fur, urine, saliva, etc.) such that the collection media 108 may be tested and used as an indicator for the health of the target animal, or a colony of animals of which the target animal is a member. As described, in some examples, the collection media 108 may be removable from the collection apparatus 100. As such, the collection media 108 may be designed to work with existing testing methods and/or devices.

Figure 2:
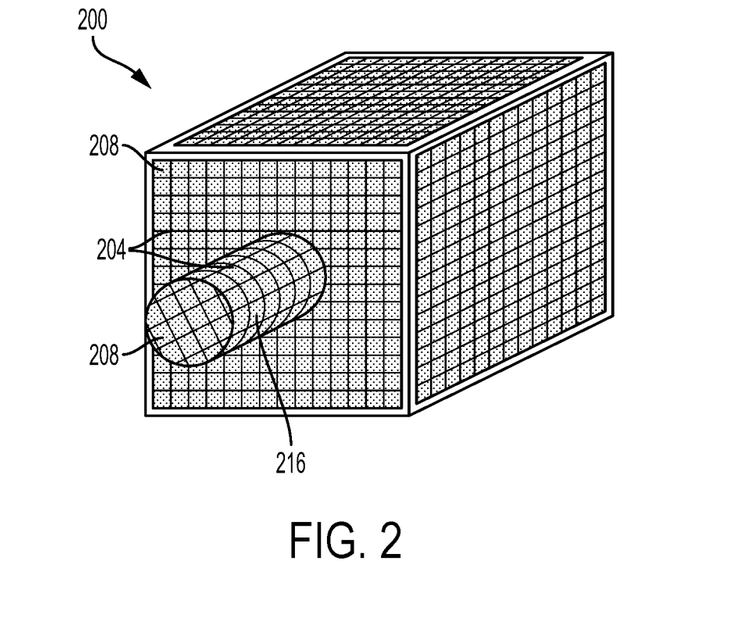
FIG. 2 illustrates a cage-sample collection apparatus, according to an example embodiment.

Continuing with the Figures, FIG. 2 illustrates a cage-sample collection apparatus 200, according to an example embodiment. The cage-sample collection apparatus 200 includes a perforated housing 204, a collection media 208, and a chewable feature 216. The cage-sample collection apparatus 200 may be similar in form and function to the cage-sample collection apparatus 100 of FIG. 1, and as such the collection apparatus 200 may include features that are similar to the collection apparatus 100.

As shown in FIG. 2, the cage-sample collection apparatus 200 may take a variety of shapes and forms, and may include one or more shapes or components. For example, an exterior shape of the perforated housing 204 of the collection apparatus 200 may be square, rectangular, or a cube. The perforated housing 204 may include the chewable feature 216. The chewable feature 216 may have perforations similar to the rest of the perforated housing 204, however the chewable feature 216 may be a size and shape such that a target animal can further interact with the collection apparatus 200. The chewable feature 216 may also provide for easier collection and increased exposure of the collection media 208 to a sample from the target animal. For example, the collection media 208 may be disposed within the chewable feature 216. Moreover, the chewable feature 216 may also include the collection 208 media and/or be considered an environmental enrichment component or device as part of the collection apparatus 200. In addition, the chewable feature can be configured to be removed and/or replaced if its use results in decreased size or utility.

Figure 3:
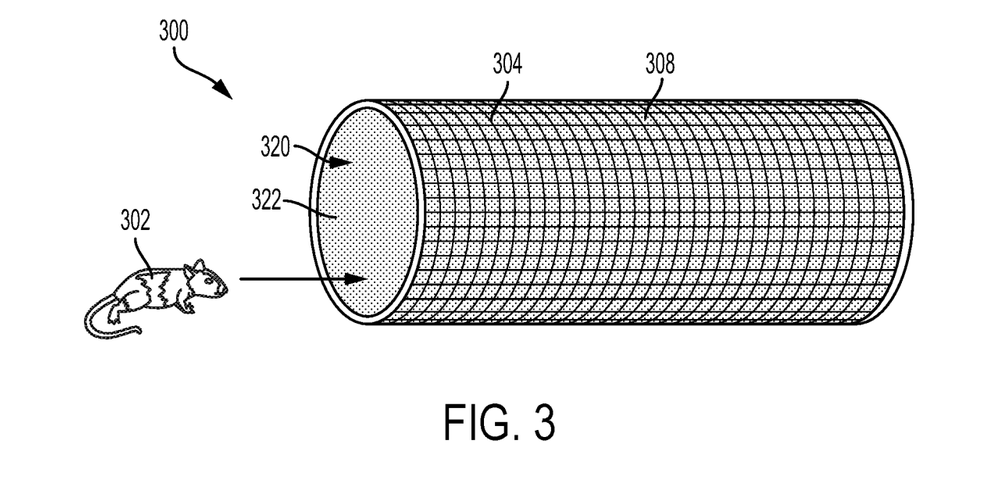
FIG. 3 illustrates a cage-sample collection apparatus, according to an example embodiment.

Continuing with the Figures, FIG. 3 illustrates a cage-sample collection apparatus 300, according to an example embodiment. The cage-sample collection apparatus 300 includes a perforated housing 304, a collection media 308, and an opening 320. The cage-sample collection apparatus 300 may be similar in form and function to the cage-sample collection apparatus 200 of FIG. 2 and/or the cage-sample collection apparatus 100 of FIG. 1. As such, the collection apparatus 300 may include features that are similar to the collection apparatus 100 and/or the collection apparatus 200.

As depicted in FIG. 3, the perforated housing 304 may be tunnel-like or tubular in shape and include the opening 320 such that a target animal 302 can enter the perforated housing 304. While shown cylindrical in shape, the cross section can be a variety of shapes that accommodate an animal in close proximity. Within examples, an interior surface 322 of the tubular perforated housing 304 may incorporate the collection media 308 and/or be mesh or perforated such that the collection media 308 may be disposed between an exterior surface and the interior surface 322 of the perforated housing 304. In other examples, the collection media 308 may be secured to the outside of a housing that may be similar to the perforated housing 304. The target animal 302 may interact with the collection media 308 and/or perforated housing 304 by passing through the perforated housing 304. The shape of the perforated housing 304 may provide for increased activity between the target animal 302 and the collection apparatus 300 such that the collection media 308 is exposed to more samples.

In other examples, a pass-through design of the perforated housing 304 may be utilized between enclosures, cages, or as part of a cage. As such, when the target animal 302 moves from one enclosure or cage to another, the collection media 308 may be exposed to a sample from the target animal 302 or a series of target animals. In some regards, the perforated housing 304 may be installed in a cage or set of cages and target animals may be forced or transferred through the perforated housing 304.

Figure 4:
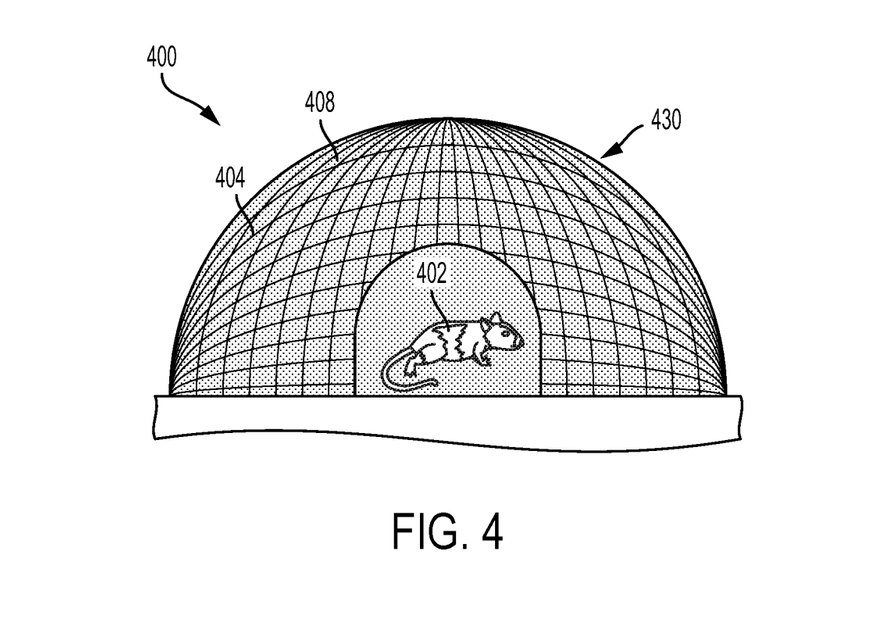
FIG. 4 illustrates a cage-sample collection apparatus, according to an example embodiment.

FIG. 4 illustrates a cage-sample collection apparatus 400, according to an example embodiment. The cage-sample collection apparatus 400 includes a perforated housing 404, a collection media 408, and an enclosure 430. The cage-sample collection apparatus 400 may be similar in form and function to the cage-sample collection apparatus 300 of FIG. 3, the cage-sample collection apparatus 200 of FIG. 2, and/or the cage-sample collection apparatus 100 of FIG. 1. As such, the collection apparatus 400 may include features that are similar to the collection apparatus 100, the collection apparatus 200, and/or the collection apparatus 300.

As depicted in FIG. 4, the perforated housing 404 may be part of the enclosure 430. The perforated housing 404 may make up one or more walls or sections of the enclosure 430 and the collection media 408 may be disposed or located between an interior surface and an exterior surface of the perforated housing 404. The enclosure 430 may be removable and placed with a larger cage or enclosure. In other aspects, the enclosure 430 may function as the cage in which a target animal 402 is kept within. The target animal 402 may be free to enter, climb on, or otherwise interact with the perforated housing 404, thus providing various means for the target animal 402 to interact with the perforated housing 404 and thereby exposing the collection media 408 to a biologic or other sample.

Figure 5:
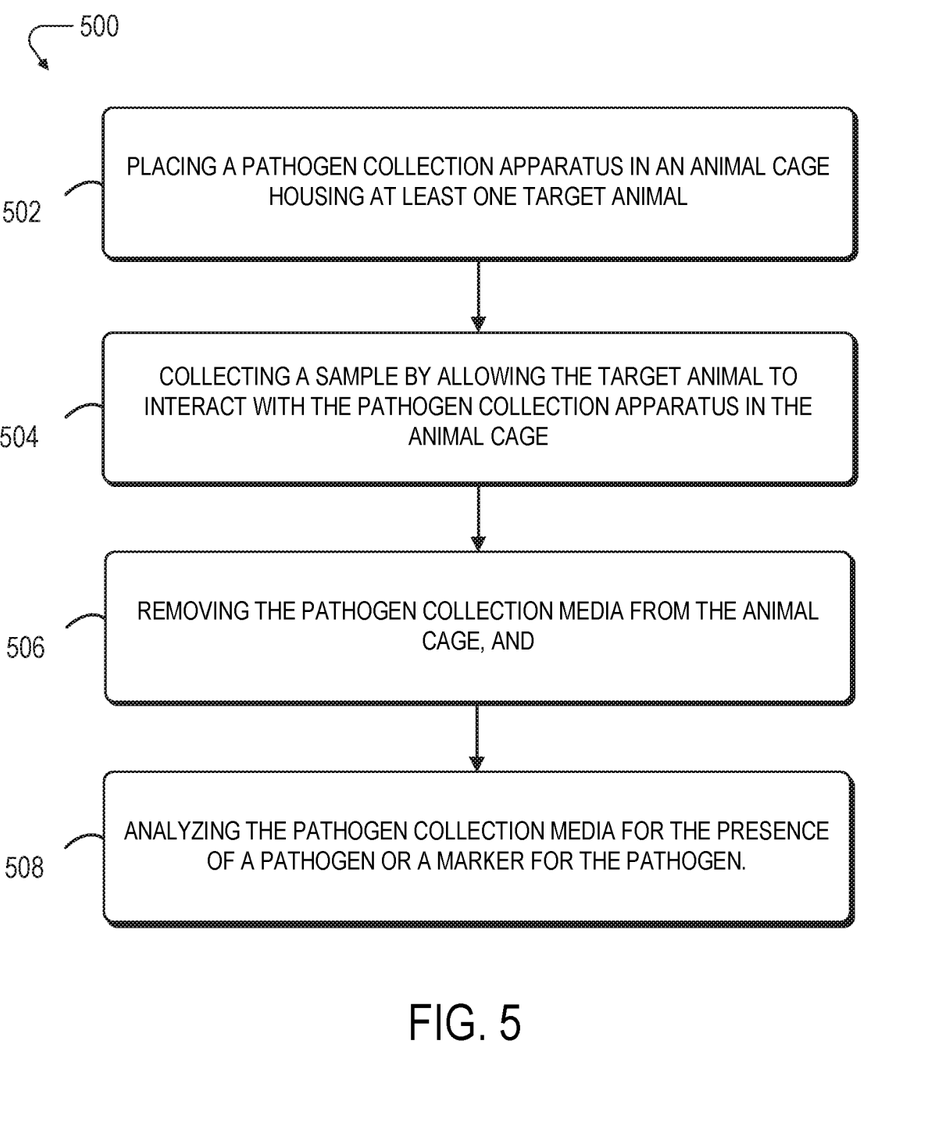
FIG. 5 is a simplified flowchart illustrating a method, according to an example embodiment.

FIG. 5 is a simplified block diagram illustrating a method 500 for analyzing a target animal for the presence of agents that may indicate a disease. Illustrative methods, such as method 500, may be carried out by one or more individuals or entities engaging means to complete the illustrative method.

As shown by block 502, the method 500 includes placing a cage-sample collection apparatus (e.g., collection apparatus 100, collection apparatus 200, collection apparatus 300, and/or collection apparatus 400 of FIG. 1-4, respectively), within an animal cage. The animal cage houses at least one target animal.

As provided in block 504, the method 500 includes collecting a sample by allowing the target animal to interact with the cage-sample collection apparatus. As described above, the target animal may interact with the collection apparatus by moving the apparatus, by entering the apparatus, by passing through the apparatus, or otherwise causing a sample (e.g., dust, feces, fur, urine, saliva, etc.) to be collected by the collection media.

As shown by block 506, the method 500 includes removing the collection media from the animal stage. In some examples, removing the collection media may include opening the perforated housing and removing the collection media. In further examples, the method 500 may include removing the collection apparatus from the animal cage.

As provided by block 508, the method 500 includes analyzing the collection media for the presence of one or more agents such as a pathogen, pathogen DNA or RNA, or a marker for the pathogen. In some examples the marker is an antibody. In some examples, analyzing the collection media may further include extracting the sample, or at least a portion of the sample, from the collection media. In such examples, the method 500 may include conducting an immunoassay for analyzing the sample for a presence or absence of at least one antibody for an infectious agent that may be indicative of an infectious disease. Moreover, analyzing the collection media may include extracting the sample from the collection media and analyzing the sample for a presence of a pathogen nucleic acid.

FIG. 6 provides results of an experiment comparing the outcome of analyzing direct cage swab samples ("Cage Swab") to an example embodiment of the cage-sample collection apparatus of the present disclosure ("Cage Ball").

In the experiment, eight cages each contained a single mouse for a period of two weeks. The mice were obtained from a local pet store to increase the likelihood that the mice would test positive for exemplary pathogens to be tested. In the experiment, one cage-sample collection apparatus, cage ball, or sentinel ball, as it was termed for the experiment because the collection apparatus was acting similar to a "sentinel," was placed in each cage with each mouse. In some aspects, the cage ball used in the experiment described herein may be similar to the collection apparatus 100 of FIG. 1. More specifically, the particular collection apparatus used in this experiment was a metallic tea-ball (that which is used to make tea) apparatus that is commercially available. The mice moved the cage ball around the cage, buried the cage ball in the bedding, and otherwise interacted with the cage ball. After the two week period, the cage balls were removed from the cages, and the collection media, a pair of flocked swab tips in the experimental implementation, were tested. Nucleic acids were extracted from the flocked swab tips using commercially available reagents and a commercially available extraction platform designed for the purpose of extracting nucleic acids for molecular analysis. Extracted nucleic acids were examined for the presence of nucleic acids of the twenty target organisms listed in FIG. 6 collectively, using a commercially available real-time PCR platform.

FIG. 6 lists the twenty various target organisms (e.g., pathogen or opportunistic pathogen) organized across the table in columns. Results for the testing of each target organism within each of the eight cages are organized and identified in the various rows of FIG. 6. Negative test results (i.e., any indication of the particular target organism was below a threshold amount) are indicated by a dash, "-". Positive test results (i.e., an indication of the particular target organism above a threshold amount) is indicated by a number. The number provided in each cells is called a "crossing point" (CP) value (also known as "threshold cycle" (CT) or "quantitation cycle" (CQ). The CP value is a measure of the amount of target template DNA (i.e., the pathogen or marker thereof) present in the tested sample. A lower CP value indicates that more of the pathogen DNA is present. Approximately every 3.3 CP points corresponds to a LOG10 reduction in pathogen DNA that is present in the sample. It is common to set a threshold value for each assay (based on the signal-to-noise ratio for that particular assay) and call positive samples those with a CP below that threshold value.

Within FIG. 6, below the table of CP results, is a direct comparison of CP values between the Cage Ball implementation of the collection apparatus and direct cage swab testing. The results provide that the Cage Ball CP values are comparable to, or even slightly lower than, the CP value of the direct cage swabs. As provided in the rows titled Cage Ball Missed and Cage Swab Missed, the Cage Ball implementation did not identify a target organism seven times where the direct cage swab did identify a target organism. However, the direct cage swab did not identify a target organism eighteen times where the Cage Ball did identify a target organism. These results indicate that the Cage Ball collected pathogen DNA at least as well as the direct cage swabs.

The present disclosure is not to be limited in terms of the embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

What is claimed is:

1. A method of monitoring animal health, comprising:
   introducing a cage sample collection apparatus comprising a collection media in an animal cage;
   collecting an environmental sample from the cage on the cage sample collection media, wherein the environmental sample comprises at least one of dust, feces, fur, urine, and saliva;
   removing at least a portion of the collection media from the animal cage; and
   analyzing the collection media for the presence of an agent or a marker for the agent, wherein the animal cage houses at least one of:
      a mouse and wherein analyzing the collection media comprises analyzing for the presence or absence of seven or more agents selected from the group consisting of:
         a. Mouse Hepatitis Virus (MHV);
         b. Minute Virus of Mice (MVN);
         c. NS1 (Generic Parvovirus);
         d. Mouse Pneumonia Virus (MPV);
         e. Mouse Norovirus (MNV);
         f. Theiler's encephalomyelitis virus (TMEV);
         g. Mouse Group A rotavirus/Epizootic Diarrhea of Infant Mice (EDIM);
         h. Sendai virus;
         i. *Mycoplasma pulmonis;*
         j. Pneumonia Virus of Mice (PVM);
         k. Reovirus Type 3 (REO3);
         l. Lymphocytic Choriomeningitis (LCMV);
         m. Ectromelia virus;
         n. Murine adenovirus 1 (MAD1);
         o. Murine adenovirus 2 (MAD2);
         p. Polyoma virus;
         q. Encephalitozoon cuniculi;
         r. *Filobacterium rodentium*, aka. Cilia-Associated Respiratory *Bacillus* (CARB);
         s. *Clostridium piliforme;*
         t. Mouse Cytomegalovirus (MCMV);
         u. K virus;
         v. Hantaan virus;
         w. Lactate dehydrogenase-elevating virus;
         x. Mouse Thymic Virus (MTV);
         y. *Helicobacter ganmani;*
         z. *Helicobacter mastomyrinus;*
         aa. *Helicobacter* spp. (generic assay, detects all *Helicobacter* spp.);
         bb. *Mycoplasma pulmonis;*
         cc *Pasteurella pneumotropica* biotype Heyl;
         dd. *Pasteurella pneumotropica* biotype Jawetz;
         ee. *Entamoeba muris;*
         ff. *Spironucleus muris;*
         gg. *Tritrichomonas muris;*
         hh. *Aspiculuris tetraptera;*
         ii. *Syphacia obvoleta;*
         jj. Pinworm (generic assay, detects both Aspiculuris tetrapter and *Syphacia obvoleta*);
         kk. *Myocoptes musculinus;*
         ll. *Helicobacter bilis;*
         mm. *Helicobacter hepaticus;*
         nn. *Helicobacter rodentium;*
         oo. *Helicobacter typhlonius;*
         pp. *Radfordia affinis/Radfordia ensiphora/Myobia musculi;*
         qq. *Corynebacterium bovis;*
         rr. *Corynebacterium* sp. (Hyperkeratosis-associated *Corynebacterium* 2, HAC2);
         ss. *Klebsiella pneumoniae;*
         tt. *Klebsiella oxytoca;*
         uu. *Staphylococcus aureus;*
         vv. *Staphylococcus xylosis;*
         ww. *Citrobacter rodentium;*
         xx. *Pseudomonas aeruginosa;*
         yy. *Clostridium piliforme;*
         zz. *Clostridium difficile;*
         aaa. *Bordetella bronchiseptica;*
         bbb. *Bordetella hinzii;*
         ccc. *Bordetella pseudohinzii;*
         ddd. *Proteus mirabilis;*
         eee. *Proteus* spp.;
         fff. *Salmonella* spp.;
         ggg. *Salmonella enterica;*
         hhh. *Pneumocystis murina;*
         iii. Murine Astrovirus;
         jjj. *Giardia* spp.;
         kkk. *Demodex musculi;*
         lll. *Cryptosporidium* spp.;
         mmm. *Eimeria* spp.;
         nnn. *Ornithonyssus* spp.; and
         ooo. *Rodentolepis nana*; or
      a rat, and wherein the step of analyzing the collection media comprises analyzing for the presence or absence of seven or more infectious agents selected from the group consisting of:
         a. Rat Coronavirus (RCV);
         b. NS1 (Generic Parvovirus);
         c. Rat Parvovirus 1 (RPV-1);
         d. Rat Parvovirus 2 (RPV-2);
         e. Rat Minute Virus (RMV);
         f. Kilham Rat Virus (KRV);
         g. Toolan's H-1 Virus (H-1);
         h. Rat theilovirus (RTV);
         i. Sendai virus;
         j. Pneumonia Virus of Mice (PVM);

k. *Mycoplasma pulmonis;*
l. Reovirus Type 3 (REO3);
m. Lymphocytic Choriomeningitis Virus (LCMV);
n. Cilia-Associated Respiratory *Bacillus* (CARB);
o. Hantavirus;
p. *Clostridim piliforme;*
q. Mouse Adenovirus 1 (MAD1);
r. Mouse Adenovirus 1 (MAD2);
s. *Encephalitozoom cuniculi;*
t. Group B rotavirus of rats (IDIR);
u. Sialodacryoadenitis Virus (SDAV);
v. Rat Polyomavirus 2 (RPyV-2);
w. *Helicobacter bilis;*
x. *Helicobacter hepaticus;*
y. *Helicobacter rodentium;*
z. *Helicobacter typhlonius;*
aa. *Helicobacter ganmani;*
bb. *Helicobacter mastomyrinus;*
cc. *Helicobacter* spp. (generic assay, detects all *Helicobacter* spp.);
dd. *Mycoplasma pulmonis;*
ee. *Streptobacillus moniliformis;*
ff. *Streptococcus pneumoniae;*
gg. beta-hemolytic *Streptococcus* spp. (not Group B);
hh. *Pasteurella pneumotropica* biotype Heyl;
ii. *Pasteurella pneumotropica* biotype Jawetz;
jj. *Entamoeba muris;*
kk. *Spironucleus muris;*
ll. *Tritrichomonas muris;*
mm. *Aspiculuris tetraptera;*
nn. *Syphacia muris;*
oo. Pinworm (generic assay, detects both *Aspiculuris tetraptera* and *Syphacia muris*);
pp. *Corynebacterium bovis;*
qq. *Corynebacterium* sp. (Hyperkeratosis-associated *Corynebacterium* 2, HAC2);
rr. *Corynebacterium kutscheri;*
ss. *Klebsiella pneumoniae;*
tt. *Klebsiella oxytoca;*
uu. *Staphylococcus aureus;*
vv. *Staphylococcus xylosus;*
ww. *Citrobacter rodentium;*
xx. *Proteus mirabilis;*
yy. *Proteus* spp.;
zz. *Pseudomonas aeruginosa;*
aaa. *Clostridium piliforme;*
bbb. *Clostridium difficile;*
ccc. *Bordetella bronchiseptica;*
ddd. *Bordetella hinzii;*
eee. *Bordetella* pseudohinzii;
fff. *Salmonella* spp.;
ggg. *Salmonella enterica;*
hhh. *Pneumocystis* spp.;
iii. *Encephalitozoon cuniculi;*
jjj. *Giardia* spp.;
kkk. *Demodex* spp.;
lll. *Cryptosporidium* spp.;
mmm. *Eimeria* spp.;
nnn. *Polyplax* spp.;
ooo. *Myocoptes musculinus;*
ppp. *Radfordia affinis/Radfordia ensifera/Myobia musculi;*
qqq. *Ornithonyssus* spp.;
rrr. *Hymenolepis* spp.;
sss. *Rodentolepis nana;* and
ttt. *Boone Cardiovirus.*

2. The method of claim 1, wherein the collection media is introduced to the housing during a cage change.

3. The method of claim 1, wherein the analyzing comprises:
   extracting the sample from the collection media; and
   conducting an immunoassay for analyzing the sample for a presence or absence of at least one antibody for an infectious agent.

4. The method of claim 1, wherein the analyzing comprises:
   extracting the sample from the collection media; and
   analyzing the sample for a presence of an agent nucleic acid.

5. The method of claim 1, wherein collecting the environmental sample on the collection media comprises absorbing the environmental sample with the collection media.

6. The method of claim 5, wherein absorbing the environmental sample comprises absorbing the environmental sample from a bedding in the cage.

7. The method of claim 1, wherein the collection media comprises at least one of a flocked swab tip or a synthetic polymer.

* * * * *